(12) United States Patent
Tadayon et al.

(10) Patent No.: US 6,973,445 B2
(45) Date of Patent: Dec. 6, 2005

(54) DEMARCATED DIGITAL CONTENT AND METHOD FOR CREATING AND PROCESSING DEMARCATED DIGITAL WORKS

(75) Inventors: Bijan Tadayon, Germantown, MD (US); Aram Nahidipour, Mill Creek, WA (US); Xin Wang, Los Angeles, CA (US); Michael C. Raley, Downey, CA (US); Guillermo Lao, Torrance, CA (US); Thanh T. Ta, Huntington Beach, CA (US)

(73) Assignee: ContentGuard Holdings, Inc., Wilmington, DE (US)

( * ) Notice: Subject to any disclaimer, the term of this patent is extended or adjusted under 35 U.S.C. 154(b) by 281 days.

(21) Appl. No.: 09/867,754

(22) Filed: May 31, 2001

(65) Prior Publication Data

US 2002/0184159 A1 Dec. 5, 2002

(51) Int. Cl.⁷ .................................. G06F 17/60
(52) U.S. Cl. .................. 705/64; 705/57; 705/58; 700/94; 713/165; 713/200; 380/203; 380/241; 380/242; 382/100; 382/232
(58) Field of Search .................... 705/54, 57; 380/203; 713/150

(56) References Cited

U.S. PATENT DOCUMENTS

| | | | |
|---|---|---|---|
| 3,263,158 A | 7/1966 | Janis | |
| 3,609,697 A | 9/1971 | Blevins et al. | |
| 3,790,700 A | 2/1974 | Callais et al. | |
| 3,798,605 A | 3/1974 | Feistel | |
| 4,159,468 A | 6/1979 | Barnes et al. | |
| 4,220,991 A | 9/1980 | Hamano et al. | |
| 4,278,837 A | 7/1981 | Best | |
| 4,323,921 A | 4/1982 | Guillou | |
| 4,442,486 A | 4/1984 | Mayer | |
| 4,529,870 A | 7/1985 | Chaum | |
| 4,558,176 A | 12/1985 | Arnold et al. | |
| 4,593,376 A | 6/1986 | Volk | |
| 4,614,861 A | 9/1986 | Pavlov et al. | |
| 4,644,493 A | 2/1987 | Chandra et al. | |

(Continued)

FOREIGN PATENT DOCUMENTS

| | | |
|---|---|---|
| EP | 0 084 441 | 7/1983 |
| EP | 0 180 460 | 5/1986 |

(Continued)

OTHER PUBLICATIONS

Henry H. Perritt, Jr., "Technological Strategies for Protecting Intellectual Property in the Networked Multmedia Enviroment", Apr. 2–3, 1993, Knowbots, Permissions Headers & Contract Law.

(Continued)

*Primary Examiner*—Firmin Backer
(74) *Attorney, Agent, or Firm*—Marc S. Kaufman; Nixon Peabody, LLP (57) ABSTRACT

Flags are used to mark portions of content in a digital work to permit marking or demarcation of portions of the document. The demarcated portions can be handled in various ways. For example, different usage rights can be applied to demarcated portions, the demarcated portionis can be culled for use as a summary, or the like. The flags can be used to demarcate portions of content that has been downloaded to keep track of payment and download status and thus add flexibility to electronic distribution of content. A flag usage rights element can be attached to limit and control access to flags in a desired manner.

32 Claims, 3 Drawing Sheets

U.S. PATENT DOCUMENTS

| | | | |
|---|---|---|---|
| 4,658,093 | A | 4/1987 | Hellman |
| 4,713,753 | A | 12/1987 | Beobert et al. |
| 4,817,140 | A | 3/1989 | Chandra et al. |
| 4,827,508 | A | 5/1989 | Shear |
| 4,868,376 | A | 9/1989 | Lessin et al. |
| 4,891,838 | A | 1/1990 | Faber |
| 4,924,378 | A | 5/1990 | Hershey et al. |
| 4,932,054 | A | 6/1990 | Chou et al. |
| 4,937,863 | A | 6/1990 | Robert et al. |
| 4,949,187 | A | 8/1990 | Cohen |
| 4,953,209 | A | 8/1990 | Ryder, Sr. et al. |
| 4,961,142 | A | 10/1990 | Elliott et al. |
| 4,975,647 | A | 12/1990 | Downer et al. |
| 4,977,594 | A | 12/1990 | Shear |
| 4,999,806 | A | 3/1991 | Chernow et al. |
| 5,010,571 | A | 4/1991 | Katznelson |
| 5,014,234 | A | 5/1991 | Edwards, Jr. |
| 5,023,907 | A | 6/1991 | Johnson et al. |
| 5,047,928 | A | 9/1991 | Wiedemer |
| 5,050,213 | A | 9/1991 | Shear |
| 5,052,040 | A | 9/1991 | Preston et al. |
| 5,058,164 | A | 10/1991 | Elmer et al. |
| 5,103,476 | A | 4/1992 | Waite et al. |
| 5,113,519 | A | 5/1992 | Johnson et al. |
| 5,136,643 | A | 8/1992 | Fischer |
| 5,138,712 | A | 8/1992 | Corbin |
| 5,146,499 | A | 9/1992 | Geffrotin |
| 5,148,481 | A | 9/1992 | Abraham et al. |
| 5,159,182 | A | 10/1992 | Eisele |
| 5,183,404 | A | 2/1993 | Aldous et al. |
| 5,191,193 | A | 3/1993 | Le Roux |
| 5,204,897 | A | 4/1993 | Wyman |
| 5,222,134 | A | 6/1993 | Waite et al. |
| 5,235,642 | A | 8/1993 | Wobber et al. |
| 5,247,575 | A | 9/1993 | Sprague et al. |
| 5,255,106 | A | 10/1993 | Castro |
| 5,260,999 | A | 11/1993 | Wyman |
| 5,263,157 | A | 11/1993 | Janis |
| 5,263,158 | A | 11/1993 | Janis |
| 5,276,444 | A | 1/1994 | McNair |
| 5,276,735 | A | 1/1994 | Boebert et al. |
| 5,291,596 | A | 3/1994 | Mita |
| 5,301,231 | A | 4/1994 | Abraham et al. |
| 5,311,591 | A | 5/1994 | Fischer |
| 5,319,705 | A | 6/1994 | Halter et al. |
| 5,337,357 | A | 8/1994 | Chou et al. |
| 5,339,091 | A | 8/1994 | Yamazaki et al. |
| 5,341,429 | A | 8/1994 | Stringer et al. |
| 5,347,579 | A | 9/1994 | Blandford |
| 5,381,526 | A | 1/1995 | Ellson |
| 5,394,469 | A | 2/1995 | Nagel et al. |
| 5,410,598 | A | 4/1995 | Shear |
| 5,412,717 | A | 5/1995 | Fischer |
| 5,428,606 | A | 6/1995 | Moskowitz |
| 5,432,849 | A | 7/1995 | Johnson et al. |
| 5,438,508 | A | 8/1995 | Wyman |
| 5,444,779 | A | 8/1995 | Daniele |
| 5,453,601 | A | 9/1995 | Rosen |
| 5,455,953 | A | 10/1995 | Russell |
| 5,457,746 | A | 10/1995 | Dolphin |
| 5,473,687 | A | 12/1995 | Lipscomb et al. |
| 5,473,692 | A | 12/1995 | Davis |
| 5,499,298 | A | 3/1996 | Narasimhalu et al. |
| 5,502,766 | A | 3/1996 | Boebert et al. |
| 5,504,814 | A | 4/1996 | Miyahara |
| 5,504,818 | A | 4/1996 | Okano |
| 5,504,837 | A | 4/1996 | Griffeth et al. |
| 5,509,070 | A | 4/1996 | Schull |
| 5,530,235 | A | 6/1996 | Stefik et al. |
| 5,532,920 | A | 7/1996 | Hartrick et al. |
| 5,534,975 | A | 7/1996 | Stefik et al. |
| 5,539,735 | A | 7/1996 | Moskowitz |
| 5,563,946 | A | 10/1996 | Cooper et al. |
| 5,568,552 | A | 10/1996 | Davis |
| 5,621,797 | A | 4/1997 | Rosen |
| 5,629,980 | A | 5/1997 | Stefik et al. |
| 5,633,932 | A | 5/1997 | Davis et al. |
| 5,634,012 | A | 5/1997 | Stefik et al. |
| 5,638,443 | A | 6/1997 | Stefik et al. |
| 5,649,013 | A | 7/1997 | Stuckey et al. |
| 5,655,077 | A | 8/1997 | Jones et al. |
| 5,708,717 | A | 1/1998 | Alasia |
| 5,734,823 | A | 3/1998 | Saigh et al. |
| 5,734,891 | A | 3/1998 | Saigh |
| 5,737,413 | A | 4/1998 | Akiyama et al. |
| 5,737,416 | A | 4/1998 | Cooper et al. |
| 5,745,569 | A | 4/1998 | Moskowitz et al. |
| 5,748,783 | A | 5/1998 | Rhoads |
| 5,757,907 | A | 5/1998 | Cooper et al. |
| 5,761,686 | A | 6/1998 | Bloomberg |
| 5,765,152 | A | 6/1998 | Erickson |
| 5,768,426 | A | 6/1998 | Rhoads |
| 5,825,892 | A | 10/1998 | Braudaway et al. |
| 5,892,900 | A | 4/1999 | Ginter et al. |
| 5,910,987 | A | 6/1999 | Ginter et al. |
| 5,915,019 | A | 6/1999 | Ginter et al. |
| 5,917,912 | A | 6/1999 | Ginter et al. |
| 5,920,861 | A | 7/1999 | Hall et al. |
| 5,940,504 | A | 8/1999 | Griswold |
| 5,943,422 | A | 8/1999 | Van Wie et al. |
| 5,949,876 | A | 9/1999 | Ginter et al. |
| 5,982,891 | A | 11/1999 | Ginter et al. |
| 5,999,949 | A | 12/1999 | Crandall |
| 6,047,067 | A | 4/2000 | Rosen |
| 6,112,181 | A | 8/2000 | Shear et al. |
| 6,115,471 | A | 9/2000 | Oki et al. |
| 6,138,119 | A | 10/2000 | Hall et al. |
| 6,157,721 | A | 12/2000 | Shear et al. |
| 6,185,683 | B1 | 2/2001 | Ginter et al. |
| 6,233,684 | B1 | 5/2001 | Stefik et al. |
| 6,237,786 | B1 | 5/2001 | Ginter et al. |
| 6,240,185 | B1 | 5/2001 | Van Wie et al. |
| 6,253,193 | B1 | 6/2001 | Ginter et al. |
| 6,226,618 | B1 | 7/2001 | Ye et al. |
| 6,292,569 | B1 | 9/2001 | Shear et al. |
| 6,301,660 | B1 | 10/2001 | Benson |
| 6,304,659 | B1 * | 10/2001 | Gold et al. ............... 380/239 |
| 6,327,652 | B1 | 12/2001 | England et al. |
| 6,330,670 | B1 | 12/2001 | England et al. |
| 6,345,256 | B1 | 2/2002 | Milsted et al. |
| 6,363,488 | B1 | 3/2002 | Ginter et al. |
| 6,389,402 | B1 | 5/2002 | Ginter et al. |
| 6,757,800 | B1 * | 6/2004 | Estakhri et al. ............ 711/168 |
| 2002/0059363 | A1 * | 5/2002 | Katz et al. ................ 709/203 |
| 2003/0009248 | A1 * | 1/2003 | Wiser et al. ................ 700/94 |
| 2003/0140114 | A1 * | 7/2003 | Katz et al. ................ 709/217 |

FOREIGN PATENT DOCUMENTS

| | | |
|---|---|---|
| EP | 0 332 707 | 9/1989 |
| EP | 0 651 554 | 5/1995 |
| EP | 0 668 695 | 8/1995 |
| EP | 0 725 376 | 8/1996 |
| GB | 2 136 175 | 9/1984 |
| GB | 2 236 604 | 4/1991 |
| JP | 62-241061 | 10/1987 |
| JP | 64-068835 | 3/1989 |
| JP | 04-369068 | 12/1992 |
| JP | 05-268415 | 10/1993 |
| JP | 06-175794 | 6/1994 |
| JP | 06-215010 | 8/1994 |
| JP | 07-084852 | 3/1995 |

| | | | |
|---|---|---|---|
| JP | 07-200317 | 8/1995 | |
| JP | 07-244639 | 9/1995 | |
| JP | 0 715 241 | 6/1996 | |
| WO | WO 92/20022 | 11/1992 | |
| WO | WO 99/56492 | * 11/1992 | ............ H04Q/7/38 |
| WO | WO 93/01550 | 1/1993 | |
| WO | WO 94/01821 | 1/1994 | |
| WO | WO 96/24092 | 8/1996 | |
| WO | WO 97/48203 | 12/1997 | |
| WO | WO 98/11690 | 3/1998 | |
| WO | WO 98/42098 | 9/1998 | |
| WO | WO 99/49615 | 9/1999 | |
| WO | WO 01/63528 | 8/2001 | |

OTHER PUBLICATIONS

"National Semiconductor and EPR Partner for Information Metering/Data Security Cards" Mar. 4, 1994, Press Release from Electronic Publishing Resources, Inc.

Weber, R., "Digital Rights Management Technology" Oct. 1995.

Flasche, U. et al., "Decentralized Processing of Documents", pp. 119–131, 1986, Coumput. & Graphics, vol. 10, No. 2.

Mori, R. et al., "Superdistribution: The Concept and the Architecture", pp. 1133–1146, 1990, The Transactions of.

Weber, R., "Metering Technologies for Digital Intellectual Property", pp. 1–29, Oct. 1994, A Report to the International Federation of Reproduction Rights Organizations.

Clark, P.C. et al., "Bits: A Smartcard protected Operating System", pp. 66–70 and 94, Nov. 1994, Communications of the ACM, vol. 37, No. 11.

Ross, P.E., "Data Guard", pp. 101, Jun. 6, 1994, Forbes.

Saigh, W.K., "Knowledge is Sacred", 1992, Video Pocket/Page Reader Systems, Ltd.

Kahn, R.E., "Deposit, Registration and Recordation in an Electronic Copyright Management System", pp. 1–19, Aug. 1992, Corporation for National Research Initiatives, Virginia.

Hilts, P. et al., "Books While U Wait", pp. 48–50, Jan. 3, 1994, Publishers Weekly.

Strattner, A, "Cash Register on a Chip may Revolutionize Software Pricing and Distribution; Wave Systems Corp.", pp. 62, Apr. 1994, Computer Shopper, vol. 14, No. 4, ISSN 0886-0556.

O'Conner, M., "New Distribution Option for Electronic Publishers; iOpener Data Encryption and Metering System for CD–ROM use; Col.", pp. 134, Mar. 1994, CD–ROM Professional, vol. 7, No. 2, ISSN: 1409–0833.

Willett, S., "Metered PCs: Is Your System Watching You? Wave System beta tests new technology", pp. 84, May 2, 1994, InfoWorld.

Linn, R., "Copyright and Information Services in the Context of the National Research and Education Network", pp. 9–20, Jan. 1994, IMA Intellectual Property Project Proceedings, vol. 1, Issue 1.

Perrit, Jr., H., "Permission Headers and Contract Law", pp. 27–48, Jan. 1994, IMA Intellectual Property Project Proceedings, vol. 1, Issue 1.

Upthegrove, L., "Intellectual Property Header Descriptors: A Dynamic Approach", pp. 63–66, Jan. 1994, IMA Intellectual Property Proceedings, vol. 1, Issue 1.

Sirbu, M., "Internet Billing Service Design and prototype Implementation", pp. 67–80, Jan. 1994, IMA Intellectual Property Project Proceedings, vol. 1, Issue 1.

Simmel, S. et al., "Metering and Licensing of Resources: Kala's General Purpose Approach", pp. 81–110, Jan. 1994, IMA Intellectual Property Project Proceedings, vol. 1, Issue 1.

Kahn, R., "Deposit, Registration and Recordation in an Electronic Copyright Management System", pp. 111–120, Jan. 1994, IMA Intellectual Property Project Proceedings, vol. 1, Issue 1.

Tygar, J. et al., "Dyad: A System for Using Physically Secure Coprocessors", pp. 121–152, Jan. 1994, IMA Intellectual Property Project Proceedings, vol. 1, Issue 1.

Griswold, G., "A Method for Protecting Copyright on Networks", pp. 169–178, Jan. 1994, IMA Intellectual Property Project Proceedings, vol. 1, Issue 1.

Nelson, T., "A Publishing and Royalty Model for Networked Documents", pp. 247–259, Jan. 1994, IMA Intellectual Property Project Proceedings, vol. 1, Issue 1.

Robinson, E., "Redefining Mobile Computing", pp. 238–240, 247–248 and 252, Jul. 1993 PC Computing.

Abadi, M. et al., "Authentication and Delegation with Smart–cards", 1990. Research Report DEC Systems Research Center.

Mark Stefik, "Letting Loose the Light: Igniting Commerce in Electronic Publication", pp. 219–253, 1996, Internet Dreams: Archetypes, Myths, and Metaphors, IDSN 0–262–19373–6.

Mark Stefik, "Letting Loose the Light: Igniting Commerce in Electronic Publication", pp. 2–35, Feb. 8, 1995, Internet Dreams: Archetypes, Myths and Metaphors.

* cited by examiner

| Start Flag 310 | | | | | | | |
|---|---|---|---|---|---|---|---|
| | | | | | | | |
| | | | | | | | End Flag 320 |
| | | | | | | | |
| Start Flag 310 | | | End Flag 320 | | | | |
| | | | | | | | |
| | | | | | | | |
| | | | | | | | |

DEMARCATED DIGITAL CONTENT AND METHOD FOR CREATING AND PROCESSING DEMARCATED DIGITAL WORKS

RELATED APPLICATION DATA

This application is related to Applicants' patent applications entitled METHOD AND APPARATUS FOR TRANSFERRING USAGE RIGHTS AND DIGITAL WORK HAVING TRANSFERRABLE USAGE RIGHTS (Ser. No. 09/867,740), METHOD AND APPARATUS FOR ESTABLISHING USAGE RIGHTS FOR DIGITAL CONTENT TO BE CREATED IN THE FUTURE (Ser. No. 09/867,747), METHOD AND APPARATUS FOR DYNAMICALLY ASSIGNING USAGE RIGHTS TO DIGITAL WORKS (Ser. No. 09/867,745), METHOD AND APPARATUS FOR ASSIGNING CONDITIONAL OR CONSEQUENTIAL RIGHTS TO DOCUMENTS AND DOCUMENTS HAVING SUCH RIGHTS (Ser. No. 09/867,749), and METHOD AND APPARATUS FOR HIERARCHICAL ASSIGNMENT OF RIGHTS TO DOCUMENTS AND DOCUMENTS HAVING SUCH RIGHTS (Ser. No. 09/867,748), which are being filed concurrently herewith, and are incorporated herein by reference in their entirety.

BACKGROUND

The subject invention relates generally to management of digital works and more specifically to demarcated digital content and a method for demarcating the content of digital works and processing the digital works.

One of the most important issues impeding the widespread distribution of digital works or documents (i.e. documents in forms readable by computers), via electronic means, and the Internet in particular, is the current lack of ability to enforce the intellectual property rights of content owners during the distribution and use of digital works. Efforts to resolve this problem have been termed "Intellectual Property Rights Management" ("IPRM"), "Digital Property Rights Management" ("DPRM"), "Intellectual Property Management" ("IPM"), "Rights Management" ("RM"), and "Electronic Copyright Management" ("ECM"), collectively referred to as "Digital rights management (DRM)" herein. There are a number of issues to be considered in digital rights management: authentication, authorization, accounting, payment and financial clearing, rights specification, rights verification, rights enforcement, and document protection for example. U.S. Pat. Nos. 5,530, 235, 5,634,012, 5,715,403, 5,638,443, and 5,629,980 disclose DRM concepts addressing these issues and are incorporated herein by reference.

In the world of printed documents, a work created by an author is usually provided to a publisher, which formats and prints numerous copies of the work. The copies are then sent by a distributor to bookstores or other retail outlets, from which the copies are purchased by end users. While the low quality of copying and the high cost of distributing printed material have served as deterrents to unauthorized copying of most printed documents, it is far too easy to copy, modify, and redistribute unprotected digital works. Accordingly, some method of protecting digital works is necessary to make it more difficult to copy them without authorization.

Unfortunately, it has been widely recognized that it is difficult to prevent, or even deter people from making unauthorized distributions of electronic works within current general-purpose computing and communications systems such as personal computers, workstations, and other devices connected over communications networks, such as local area networks (LANs), intranets, and the Internet. Many attempts to provide hardware-based solutions to prevent unauthorized copying have proven to be unsuccessful. The proliferation of high band-width "broadband" communications technologies will render it even more convenient to distribute large documents electronically, including video files such as full length motion pictures, and thus will remove any remaining deterrents to unauthorized distribution of digital works. Accordingly, DRM technologies are becoming a high priority.

Two basic DRM schemes have been employed to attempt to solve the document protection problem: secure containers and trusted systems. A "secure container" (or simply an encrypted document) offers a way to keep document contents encrypted until a set of authorization conditions are met and some copyright terms are honored (e.g., payment for use). After the various conditions and terms are verified with the document provider, the document is released to the user in clear form. Commercial products such as IBM's CRYPTOLOPES™ and InterTrust's DIGIBOXES™ fall into this category. Clearly, the secure container approach provides a solution to protecting the document during delivery over insecure channels, but does not provide any mechanism to prevent legitimate users from obtaining the clear document and then using and redistributing it in violation of content owners' intellectual property.

Cryptographic mechanisms are typically used to encrypt (or "encipher") documents that are then distributed and stored publicly, and ultimately privately deciphered by authorized users. This provides a basic form of protection during document delivery from a document distributor to an intended user over a public network, as well as during document storage on an insecure medium.

In the "trusted system" approach, the entire system is responsible for preventing unauthorized use and distribution of the document. Building a trusted system usually entails introducing new hardware such as a secure processor, secure storage and secure rendering devices. This also requires that all software applications that run on trusted systems be certified to be trusted. While building tamper-proof trusted systems is a real challenge to existing technologies, current market trends suggest that open and untrusted systems such as PC's and workstations using browsers to access the Web, will be the dominant systems used to access digital works. In this sense, existing computing environments such as PC's and workstations equipped with popular operating systems (e.g., Windows™, Linux™, and UNIX) and rendering applications such as browsers are not trusted systems and cannot be made trusted without significantly altering their architectures. Of course, alteration of the architecture defeats a primary purpose of the Web, i.e. flexibility and compatibility.

U.S. Pat. No. 5,634,012, the disclosure of which is incorporated herein by reference, discloses a system for controlling the distribution of digital documents. Each rendering device has a repository associated therewith. A predetermined set of usage transaction steps define a protocol used by the repositories for carrying out usage rights associated with a document. Usage rights are encapsulated with the document content or otherwise associated with the document to travel with the document. The usage rights can permit various types of use such as, viewing only, use once, distribution, and the like. Rights can be granted based on payment or other conditions.

Figure 1:
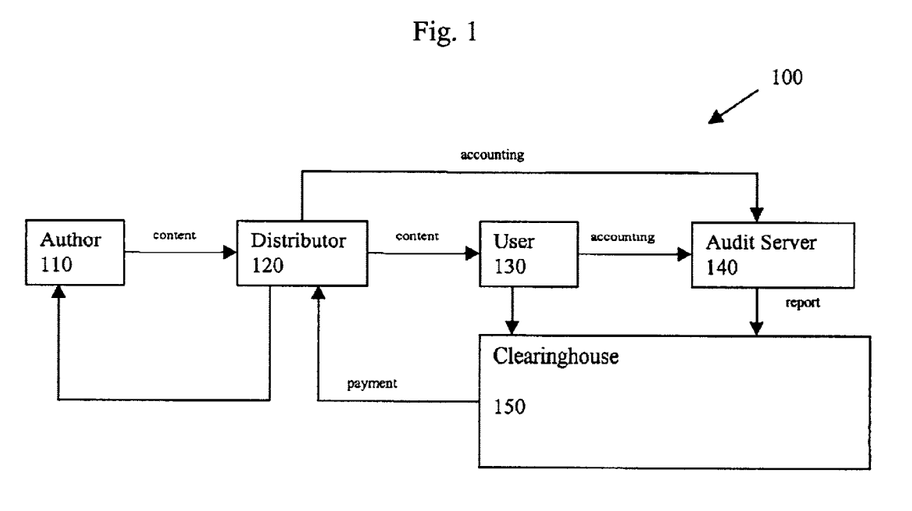
FIG. 1 is a block diagram of a conventional digital work distribution system.

FIG. 1 is a block diagram of a conventional model for a system for the electronic distribution of digital works, which may include correspondence, books, magazines, journals, newspapers, other papers, software, audio and video clips, and other files objects, and the like. The phrase "digital work" as used herein refers to any type of element having content in computed readable form. "Content" as used herein refers to the viewable or otherwise usable portion of a digital work. Author 110 creates original content 112 and passes it to a distributor 120 for distribution. Ordinarily, author 110 is the creator of the content. However, the term "author" as used herein can be the creator, owner, editor, or other entity controlling the content or an agent (e.g. a publisher) of one of those entities. Also author 110 may distribute documents directly, without involving another party as distributor 120 and thus the author and distributor may be the same entity. However, the division of functions set forth in FIG. 1 is more efficient, as it allows author 110 to concentrate on content creation and not the administrative functions of distribution. Moreover, such a breakdown facilitates economies of scale by permitting distributor 120 to associate with a number of authors 110. Distributor 120 distributes digital works to user 130 upon request. In a typical electronic distribution model, the work is distributed as a document containing the content and associated usage rights in encrypted form. Distributor 120 encrypts the works with a random key and then encrypts the random key with a public key corresponding to user 130. Thus the encrypted work is customized solely for the particular user 130. User 130 is then able to use their private key to unencrypt the random key and use it to unencrypt and view the content at the work.

Payment for the work is passed from user 130 to distributor 120 by way of clearinghouse 150 which collects requests from user 130 and from other users who wish to sue a particular content. Clearinghouse 150 also collects payment information, such as debit transactions, credit card transactions, or other known electronic payment schemes, and forwards the collected payments as a payment batch to distributor 120. Of course, clearinghouse 150 may retain a share of the payment as a fee for the above-noted services. Distributor 120 may retain a portion of the batch payment from clearinghouse 150 for distribution services and forward a payment (for example royalties) to author 110. Distributor 120 may compile a bundle or batch of user requests for a single work before distributing the work. In such a case, a single instance of the encrypted work can be generated for unencryption by all of the requesting users 130.

Each time user 130 requests (or uses) content of a work, an accounting message is sent to audit server 140 which ensures that each request by user 130 matches with a document sent to user 130 by distributor 120. Accounting information is received by audit server 140 directly from distributor 120. Any inconsistencies are transmitted via a report to clearinghouse 150, which can then adjust the payment batches made to distributor 120 accordingly. This accounting scheme is operative to reduce the possibility of fraud in electronic distribution and to handle any time-dependent usage permissions that may result in charges that vary, depending on the duration or other extent of use.

SUMMARY OF THE INVENTION

A first aspect of the invention is a digital work recorded on computer readable media comprising a content element including content data to be utilized by an end user, a content usage rights element associated with the content element and including data stored in addressable memory and specifying usage rights for the content element, and a flag element associated with the content element and having memory registers for saving demarcation flags.

A second aspect of the invention is a method of marking portions of content data of a digital work stored in addressable memory comprising, associating a flag element with the content data, the flag element having memory registers for saving demarcation flags, selecting a portion of the content to be marked, and manipulating the flag element to indicate the marked portion of the content.

BRIEF DESCRIPTION OF THE DRAWING

The invention will be described through a preferred embodiment and the attached drawing in which.

DETAILED DESCRIPTION

DRM techniques and systems permit digital works to be distributed electronically while allowing the content owner, such as the copyright holder, to control use of the content and receive remuneration for the content. However, there are still several factors that tend to prohibit widespread electronic distribution of many works, such as works having a large amount of content, valuable content, and the like. For example, many devices, such as pagers and personal digital assistants (PDAs), have limited memory and communications bandwidth. Therefore, in many cases it is not practical, or even possible to download a work in its entirety to such devices. Of course, the publisher could divide the intended work into plural documents of a smaller size. However, in such a case, the user would have to go through the purchasing and download procedure plural times to receive the entire intended work. Also, different devices have different memory sizes and communications bandwidth. Accordingly, the publisher would have to divide the document into documents of a size corresponding to the smallest memory and lowest bandwidth, i.e. the lowest common denominator, to ensure compatibility with all devices.

Consider a hypothetical situation in which a consumer orders a book or other digital work. If the digital work is too large to fit into the available memory of the user's device, then the download of the digital document will fail. Alternatively, if the work takes too long to download, the user may terminate the download. In either case, a sale may be lost, or the user may be charged for a work not received, depending on the fault tolerance of the distributor's system.

Applicant has discovered that portions of a work can be demarcated from the other portions thereof in a flexible and dynamic manner to be downloaded and used independently of other portions. Markers, i.e. flags, can be used to mark portions of the document that were downloaded and portions that were not downloaded. The flags and the content can be stored in the same memory device or in different memory device at different locations. Further, the flags can be stored in the user's device or stored in a remote central server, for example the distributor's server. A file containing the flags can be associated with the content of the work in any way. The flags (as the markers of the content) can inform the server that only certain portions of the document have been downloaded, and thus can be used to keep track of downloaded portions, to save memory space or transmission time. The flags can be used as a basis for the fee required from user 130 to be paid to the distributor 120 or clearing house 152. For example fees can be based on the amount of the content requested for download, or actually downloaded, during a download session. The invention can be adapted for use with the conventional distribution system illustrated in FIG. 1 or any other system.

Figure 2:
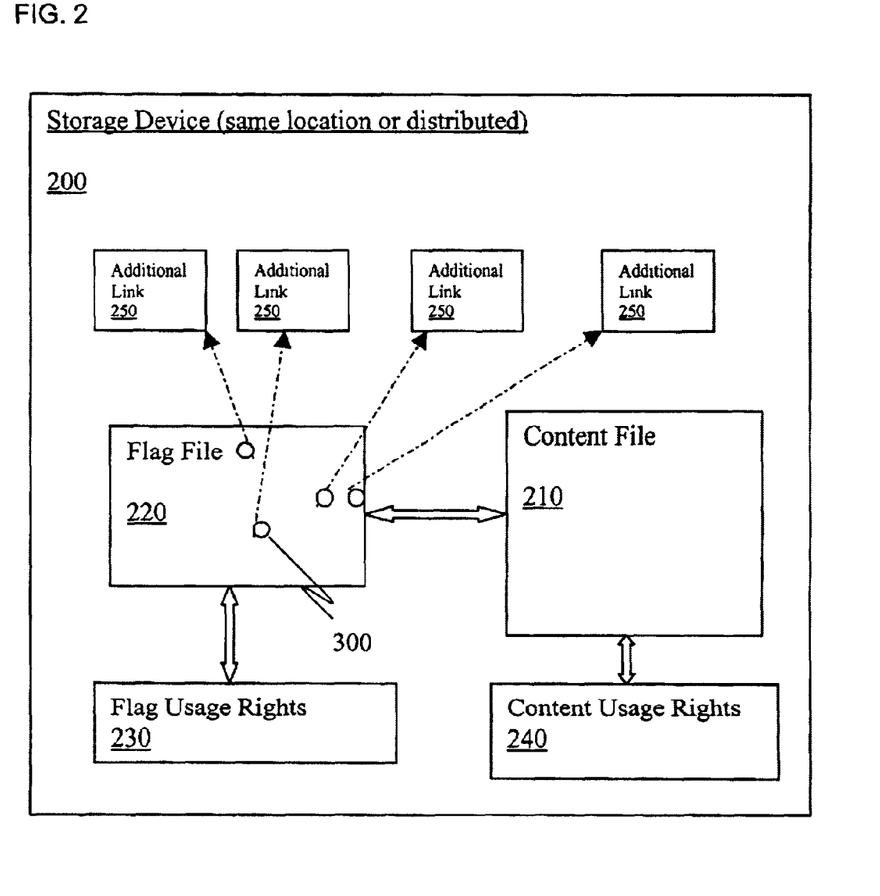
FIG. 2 is a block diagram of the a storage device having a digital work in accordance with the preferred embodiment stored thereon.

FIG. 2 illustrates the relationship between flags and document content of a work in accordance with preferred embodiment. Content file 210 is stored on storage device 200 and includes information to be downloaded to a user device, i.e. content data, for use by user 130. For example, content file 210 can include a book, music, video clip, or the like. Content usage rights 240 are associated with content file 210 in a known manner. For example, content usage rights 240 can be of the form disclosed in U.S. Pat. No. 5,634,012 and can be associated with content file 210 in the manner disclosed in the same patent. Flag file 220 (described in detail below) is also stored in memory device 200 and is associated with content file 210. Further, flag usage rights 230 are associated with flag file 220 to specify usage rights for flag file 220. In other words, flag usage rights 230 specify who may make changes to flag file 220 and under what circumstances such changes can be made. The phrase "associated with" as used herein, broadly refers to a correspondence, such as a call, a link, an Application Programming Interface (API) call, or commands in an executable program creating a correspondence between files or information.

Accordingly, upon download of a portion of content file 210, flag file 220 can be created, changed, or otherwise manipulated, to include one or more flags indicating which portions of content file 210 have been downloaded. If flag file 220 is updated whenever portions of content file 210 are downloaded, distributor 120 or clearing house 150 can monitor how much, and which portions, of content file 210 have been downloaded. This permits user 130 to be charged only for downloaded portions of content file 210 or to be charged only once for the entire content of content file 210 and permitted to download remaining portions of content file 210 at subsequent times. In such cases, flag usage rights 230 might only let distributor 120, clearing house 150, or another authorized party, manipulate flags 300 so that user 130 or others cannot tamper with the download record.

Figure 3:
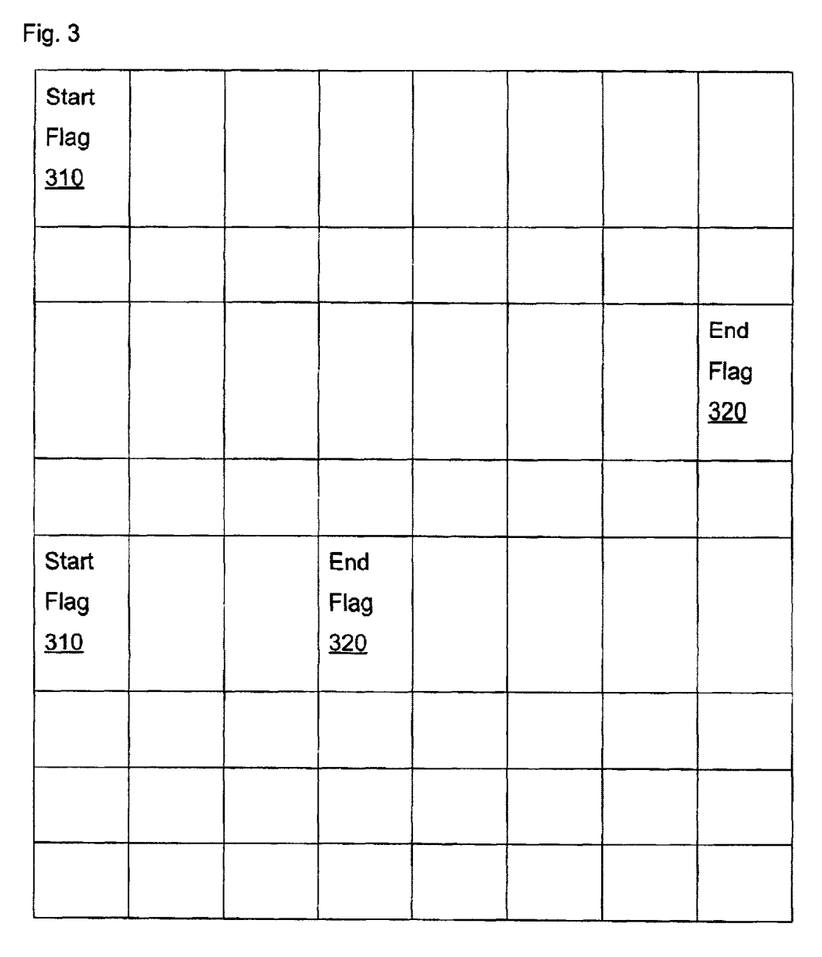
FIG. 3 is a schematic representation of the flag element of the preferred embodiment.

FIG. 3 illustrates the contents of flag file 220 of the preferred embodiment. Each box of FIG. 3 represents a memory register corresponding to an address in memory device 200, or a block of such addresses, corresponding to portions of content file 210. Flags 300 can be placed in the blocks, i.e. memory registers, to indicate the start or end, or any other aspect, of a demarcated portion of content file 210. In the preferred embodiment, flags 300 include start flags 310, and end flags 320 to respectively indicate the start and end of demarcated portions. In such a case, flags 300 can be represented by two integers to distinguish between corresponding start flags 310 and end flags 320. However, flags can be represented by a single integer if they are used merely as markers. For example, memory addresses of content file 210 between consecutive flags 300 can be demarcated. Alternatively, flags 300 can be any number of integers or in any form as required by the particular application and need to distinguish between flags 300. For example, as will become apparent below, flags 300 can serve many purposes and it may be desirable to distinguish between different types of flags. Also, a single flag can be used to mark content without a second corresponding flag.

In the preferred embodiment, the usage rights, in the form of content usage rights 240, are attached to content file 210 and are part of the digital work corresponding to content file 210. As the digital work is distributed, the scope of the granted usage rights will remain the same or may be narrowed. For example, when a digital work is transferred from a document server to another device, the usage rights may include the right to loan a copy for a predetermined period of time (called the original rights). When the device loans out a copy of the digital work, the usage rights in the loaner copy (called the next set of rights) could be set to prohibit any further rights to loan out the copy. The basic idea is that one entity or device cannot grant rights that are greater than the rights that the entity has.

The attachment of content usage rights 240 to content file 210 may be accomplished in a variety of ways as described in detail in the patents noted above and incorporated herein by reference. If the usage rights will be the same for all content in a digital work, content usage rights 240 can be attached when the digital work is processed for deposit in the server of distributor 120. An authoring tool or digital rights assembling tool can be utilized to create and attach the usage rights. For example, the XrML™ rights language and related tools can be used.

Assuming the content in digital form, or a portion thereof, has been downloaded to a device, such as the user's personal computer, PDA, or the like, user 130 may begin reading the content, for example a book. However, user 130 most likely will not finish the book in one reading session. Accordingly, after the reading session, user 130 can manipulate flag file 220 to create flag 300 (serving as a digital bookmark) to mark the unread portion of the text. The manipulation can be accomplished by the user through the device standard interface using software running on the device or another coupled device or manipulation can be automatic. For example, when the user closes the application running the book or closes the file corresponding to the downloaded book content, flag file 220 can be manipulated accordingly. The newly created flag 300 is then saved in flag file 220 for the future use of user 130, or the use of other parties having authorization to access flag file 220 as specified by flag usage rights 230. User 130 can specify multiple flags for different locations in the book. The user can specify who will have authorization for access to flags 300, or the authorization can be supplied from a predetermined source, such as a database or directory.

User 130 can be more than one entity, in which case the multiple entities can have joint authorization for manipulation of flags 300 through flag usage rights 230. A multiple signature scheme or a voting scheme can be used to ensure proper authorization by joint users. Some users may be able exercise veto power. All such rights and rules can be implemented through flag usage rights 230 in a known manner. Access to flag usage rights 230, i.e. the ability to change the usage rights for flag file 220 can be granted in a similar manner.

Further, flags 300 can be in the form of calls, links, or other references to additional digital works 250 and thus can be used to permit the user to attach additional content data, such as one or more text documents, reminder notes, music, or multimedia pieces, to the content data in content file 210. Usage rights and flags can be assigned to a content file of the additional work 250 in a manner similar to content file 210. Accordingly, a hierarchical access scheme can be established. In other words, content is attached to other content via flags 300, which are attached to some other content via flags 300, in a pyramid or tree structure.

As, discussed above, one or more flags 300 can be used to demarcate a specific portion or portions of the content data in content file 210 to be selected, separated, cut, copied, printed, or otherwise processed in a desired manner. For example, in the case of the content of content file 210 being music, the frequency or volume of a portion of the music could be changed by demarcating that portion with flags 300. Further, the demarcated content portion can be filtered or compressed using an adaptive filtering or compression scheme. The demarcated portion also could be watermarked or encrypted selectively. A demarcated portion of content corresponding to a textbook or a speech can be marked for translation to another language, using a translation engine or a human translator. Furthermore, the default currency used for payment for the content can automatically be changed in accordance with the translation language requested by the user.

Memory devices, specifically those in portable devices, are not always reliable. Therefore, a loss of data may occur, such as when the device operating system crashes, or when the device is subject to mechanical or electrical shock. In such a case, user 130 may desire to download the same content data or portions of content data to replace the content lost from memory. Of course, user 130 may have already paid for the content data. Flags 300 in flag file 220 can be used for aggregation and maintaining records of downloads and payments by user 130. For example, flag file 220 can be stored on the server of distributor 120 or clearinghouse 150 and flags 300 can demarcate portions downloaded and/or paid for by user 130. In such a case, flags 300 can be used for aggregating micropayments, i.e. plural relatively small payments, and charging the user at a future time, monthly or after downloading the entire content for example. Billing can be based on the credit limit user 130 applied for and obtained from distributor 120, clearinghouse 150, a credit card company, or other party financing the transaction. Also, flags 300 permit billing to be based on the portions of the content data purchased by user 130. Flags 300 can also be inserted automatically and be used to keep track of the reading habits (speed, frequency, and overall statistics) of user 130, based on the information gathered from many flags 300 during many sessions over a period of time.

In addition, flags 300 can be used to demarcate portions of a book or other content (by marking at least the beginning and the end of a portion of the content), from which a summary or abstract can be obtained automatically. Further usage rights and/or fees can be separately assigned to the abstract or summary as well. For example, flags 300 can demarcate specific sentences or passages that convey the essence or a preview of the content for viewing as a summary. The demarcated portions can be merely parsed out of the content and presented as the summary. Alternatively, a neural network with fuzzy logic capability, or any other artificial intelligence engine, can be applied for proper organization and classification of the demarcated portions. Such an engine can be trained or tuned to organize the demarcated portions based on keywords or relevant topics. Examples of training algorithms for artificial intelligence are the iterative algorithm for obtaining a solution weight vector for linearly separable classes, and the training by back propagation method. In general, in a successful training session, the network error decreases with the number of iterations, and the procedure converges to a stable set of weights that exhibit only small fluctuations with additional training. Fuzzy logic engines (using membership functions and fuzzy set theory) provide more flexibility to the decision process. The decisions are not merely binary but can include fuzzy terms, such as "Low", "High", "Many", and "Approximately". This is useful for classification purposes.

The obtained summary can be used for review purposes, for a database searched by a search engine, to direct the other users to the original book for further information. Demarcated words or other portions of the content data can be used for indexing a search engine using keywords/phrases selected by author 110 or publisher 120 as opposed to keywords determined by the search engine.

Furthermore, flags 300 can be used for the collection of educational course materials or assignments by a course instructor or other person setting curriculum. In particular, portions of the content can be demarcated, parsed out, and saved by distributor 120 (or given directly to students), for automatic collection and transmission of portions from different works, and for keeping track of charges to the students for those portions, according to the prices assigned for those portions. Flag file 220 can be customized for Teaching Assistants, students, or the like. For example, the Teaching Assistant's flag file 220 may include demarcated portions having quiz answers and teaching aids. Of course such portions would not be demarcated by flag file 220 for students. It can be seen that one content file 210 can have plural flag files 220 or one flag file 220 can be associated with plural content files 210.

In addition, when traveling, the user can access a large amount of content stored on their home computer or elsewhere on their behalf using a hand-held device or a wireless device. Flags 300 can be used during unfinished downloads for large files to mark parts of the content for future downloads. The determination of required memory can be done automatically before a download procedure to streamline and optimize the downloading process by placing flags 300 in registers of flag file 220 demarcating content file 210 into portions of the desired size. Further, the system, such as a content server owned by distributor 120, can be configured to auto download the demarcated portions on a periodic basis.

Generally, flags 300 can be used for customization of content for each user by demarcating and keeping track of various portions of content. For example, each user can have one or more private and public libraries (a collection of books, book chapters, articles, or other works, selected by user 130), to which others can be granted access, based on the user's assignment of content usage rights 240. There may be more than one library, one for each subject (for example, one for a history collection and one for a scientific literature collection), in which case an automatic classification based on key words or neural networks can facilitate the selection of the appropriate default library. Personal libraries are folders for flag files 220 and can be distributed to others to mark and/or link content from various locations, such as various Web sties. The content of a library can be of any type or of any combination of types. The library allows the marked works to be easily correlated and retrieved for sale or other distribution.

User 130 can demarcate the name of books in a library (or alternatively, a small portion, a sample, or summary) by manipulating flags 300 and limiting content usage rights 240 by time, copies, or the like to encourage purchase of the content by peers for super distribution, i.e. redistribution by users 130. Group discounts referral points or monetary compensation can be given to the user for any redistribution.

Once the authorization granted by content usage rights 240 to use the content has expired, the content data can be automatically erased, or modified. For example, a the content data can be changed so a watermark or an intrusive message can appear on a rendered image, making the image useless or inconvenient. Or, for music, the frequency of demarcated ranges can be increased or silenced, making it unpleasant to listen to.

When content data is accessed from or stored on multiple servers or other devices, flags 300 can be used to keep track of servers for an optimized accessing scheme. For example, flags 300 can be used for identification and referral to a specific server for edge delivery of content over the Internet or any other network (as opposed to centralized content delivery), to solve the first-mile-bottleneck problem (related to traffic on the network and speed of delivery). Flag file 230 can be stored on or accessed by a central server which keeps track of flags 300 to allow various portions of content data to be demarcated for downloading from different servers based on load on each server or other characteristics and variables.

Another application of the preferred embodiment is in record keeping, such as laboratory notebooks or other notes kept by engineers, laboratory scientists and others. Conventionally, a laboratory scientist or engineer records test results, observations, and comments on a conventional paper lab notebook for future reference. The "lab notebook" is continuous, cannot easily be altered, is initialed and dated by the user, witnessed by others, and often is stored in a physically secure place. Such procedures render laboratory notebooks valuable as reliable evidence in legal proceedings, such as for establishing the date of recorded activity. Because of the ability to tamper with digital records, digital records have not been utilized to a great extent as laboratory notebooks or other legal records.

To provide a comparable level of protection and integrity in a digital work, an electronic lab notebook can be provided, in which the text, figures, tables, or data can only be inserted at the end of the file. The text, figures, tables, or data can be changed, However, in such a case, all of the previous versions remain intact in the file for future inspection or auditing. The content data of the electronic lab notebook can be stored in content file 210 and previous versions can be demarcated by flags 300 to be hidden as a default for convenience and ease of review. The time and dates for each session can be recorded according to a secure and centralized clock, i.e. all entries are time-stamped, together with the electronic signatures, i.e. a code that can be attached to a document to uniquely identify an individual creating or modifying the document of the users and witnesses. Each session can be marked clearly by flags 300 and indexed in a database using an automatic search engine. The contents of the electronic laboratory notebook can be stored in content file 210 and the sessions, entries or previous versions are demarcated by flags 300 stored in flag file 220 and rights thereto are specified by content usage rights 240.

The overall work, or just content file 210, can be encrypted, or hash functions can be applied thereto, to insure the integrity of the data. A "hash value" is a number generated from a string of binary value. The hash is substantially smaller than the original data itself, and is generated by a formula in such a way that it is extremely unlikely that some other data will produce the same hash value. Hash values thus can be used to ensure that content has not been tampered with. The creator generates a hash value of the content, encrypts it, and stores the hash value with the content in content file 210. An authorized user can subsequently decrypt both the content and the hash value and produce another hash value from the content. The original and the new hash value can then be compared. If they're the same, there is a very high probability that the content has not been tampered with.

The right to inspect or audit the electronic laboratory notebook can be different from the right to use the same and can be effected through content usage rights 240. For example, the right to inspect may be granted only to a judge or an attorney. A copy of content file 210, content usage rights 240, flag file 220, and flag usage rights file 230 corresponding to the electronic lab notebook can be transmitted to a neutral, trusted third party for safe and redundant storage. The third party preferably will not have the right to inspect the content. Plural electronic lab notebooks can be linked together or merged, in which case the encryption or hash functions should be employed again to get the resultant or total of the contents secured as a whole. The order of the changes or mergers can be recorded and demarcated by flags 300 for future auditing purposes.

The preferred embodiment can be applied to all types of the digital works having any content, such as magazines, movies, multimedia, speech, software, and music. Further, the preferred embodiment can be used in any type of distribution model such as those based on subscriptions, club membership, pay-per-view, set-top-boxes, quantity of usage, usage period of time, expiration date, number of printouts, number of copies, purchase, view, try-before-you-buy, or rental.

As noted above, different parties may have different usage rights. Accordingly, the identity of a party can be ascertained through the use biometrics (such as face recognition, iris recognition, eye recognition, fingerprint recognition, voice recognition, knuckle recognition, or hand recognition), signature analysis, Public Key Infrastructure (PKI) technology, password, device ID, smart cards, magnetic ID cards, and DRM schemes. Further, the usage rights can be granted only upon payment of a fee or other event. The content and flags of the preferred embodiment are separate files. However, the content and flags can be stored in any element and need not be separate files.

The distribution, accounting, and other functions of the distributor and clearinghouse can be accomplished by any party on any device. For example, the content can be rendered on an ebook reader or PDA in response to entry of a code or insertion of a smartcard into a reader and accounting can be accomplished when the digital work or accounting data is returned to a specific source. The division of tasks disclosed herein is only an example. Usage rights and or accounting data can be encapsulated with the digital work or can be stored separately. Code for rendering, decrypting, or otherwise permitting or limiting use of the content can be stored on any device or can be encapsulated with the digital work. Any distribution arrangement can be used with the invention and such arrangements can include any combination of devices, such as personal computers, servers, PDAs, and the like communicating with one another in any manner as is necessary to transfer the desired information.

The invention has been described through a preferred embodiment. However, various modifications can be made without departing from the scope of the invention as defined by the appended claims and legal equivalents.

What is claimed is:

1. A computer readable medium having computer readable instructions embedded therein for effecting a method for distributing digital works for use in a digital rights management system, said instructions comprising:

instructions for receiving a request from a requesting device for downloading digital content data;

instructions for associating a flag element with said digital content data, said flag element having at least one memory register;

instructions for downloading a portion of said digital content data;

instructions for manipulating said flag element to store at least one demarcation flag in at least one of said at least one memory register, said at least one demarcation flag being stored at specific locations within said at least one memory register to demarcate the downloaded portion of said digital content data; and instructions for associating at least one respective usage right with said at least one demarcation flag, said at least one respective usage right specifying a permitted manner of use of the respective demarcated downloaded portion of said digital content data, wherein said at least one memory register corresponds to memory addresses on an addressable memory indicating the downloaded portion of said digital content data, whereby the downloaded portion of the digital content data can be determined with said at least one demarcation flag without accessing the digital content data for enforcing said permitted manner of use of the respective demarcated downloaded portion of said digital content data.

2. The computer readable medium of claim 1, wherein said instructions for downloading comprises instructions for downloading a portion of said digital content data that will fit into the available memory of a device receiving said content data.

3. The computer readable medium of claim 2, further comprising instructions for determining said available memory in said device receiving said digital content data, wherein said instructions for manipulating said flag element comprises instructions for storing at least one of said demarcation flags in at least one of said memory registers corresponding to memory addresses demarcating a portion of said digital content data, said demarcated portion corresponding to said available memory of said device receiving said digital content data, and wherein said instructions for downloading a portion of said digital content data comprises instructions for downloading a portion of said digital content data in memory addresses corresponding to said demarcated portion.

4. The computer readable medium of claim 1, wherein one of said at least one demarcation flag demarcates a non-downloaded portion of said digital content data.

5. The computer readable medium of claim 1, further comprising instructions for collecting fees based on one more demarcation flags representing downloaded portions of said digital content data.

6. The computer readable medium of claim 1, further comprising instructions for collecting fees based on one more demarcation flags representing an aggregate of the downloaded portions of said digital content data.

7. The computer readable medium of claim 1, further comprising instructions for employing said at least one demarcation flag for customization of said digital content data for a user.

8. The computer readable medium of claim 1, further comprising instructions for changing a scope of said at least one respective usage right associated with said at least one demarcation flag.

9. The computer readable medium of claim 1, further comprising instructions for employing demarcation flags to implement a hierarchical access scheme with respect to a plurality of digital content data.

10. The computer readable medium of claim 1, further comprising instructions for employing demarcation flags to allow said digital content data to be at least one of selected, separated, cut, copied, and printed.

11. The computer readable medium of claim 1, further comprising instructions for employing demarcation flags to be inserted automatically to keep track of habits of a user.

12. The computer readable medium of claim 1, further comprising instructions for employing demarcation flags for securing user access to said digital content data.

13. The computer readable medium of claim 1, further comprising instructions for allowing a user to demarcate said digital content data with one or more demarcation flags.

14. The computer readable medium of claim 1, further comprising instructions for allowing said requesting device to automatically demarcate said digital content data with one or more demarcation flags.

15. The computer readable medium of claim 1, further comprising instructions for employing demarcation flags for super distribution of said digital content data to one or more users.

16. A method for distributing digital works to a computing device for use in a digital rights management system, said method comprising:

receiving a request, from a first computing device, at a second computing device, for downloading digital content data;

associating a flag element with said digital content data, said flag element having at least one memory register;

downloading a portion of said digital content data to said first computing device; and manipulating said flag element to store at least one demarcation flag in at least one of said at least one memory register, said at least one demarcation flag being stored at specific locations within said at least one memory register to demarcate the downloaded portion of said digital content data, and associating at least one respective usage right with said at least one demarcation flag, said at least one respective usage right specifying a permitted manner of use of the respective demarcated downloaded portion of said digital content data, wherein said at least one memory register corresponds to memory addresses on an addressable memory indicating the downloaded portion of said digital content data, whereby the downloaded portion of the digital content data can be determined with said at least one demarcation flag without accessing the digital content data for enforcing said permitted manner of use of the respective demarcated downloaded portion of said digital content data.

17. The method of claim 16, wherein said downloading step comprises instructions for downloading a portion of said digital content data that will fit into the available memory of said first computing device.

18. The method of claim 17, further comprising the step of determining said available memory in said first computing device, wherein said manipulating step comprises storing at least one of said demarcation flags in at least one of said memory registers corresponding to memory addresses demarcating a portion of said digital content data, said demarcated portion corresponding to said available memory of said first computing device, and wherein said downloading step comprises downloading a portion of said digital content data in memory addresses corresponding to said demarcated portion.

19. The method of claim 16, wherein one of said at least one demarcation flag demarcates a non-downloaded portion of said digital content data.

20. The method of claim 16, further comprising collecting fees based on one more demarcation flags representing downloaded portions of said digital content data.

21. The method of claim 16, further comprising collecting fees based on one more demarcation flags representing an aggregate of the downloaded portions of said digital content data.

22. The method of claim 16, further comprising employing said at least one demarcation flag for customization of said digital content data for a user.

23. The method of claim 16, further comprising changing a scope of said at least one respective usage right associated with said at least one demarcation flag.

24. The method of claim 16, further comprising employing demarcation flags to implement a hierarchical access scheme with respect to a plurality of digital content data.

25. The method of claim 16, further comprising employing demarcation flags to allow said digital content data to be at least one of selected, separated, cut, copied, and printed.

26. The method of claim 16, further comprising employing demarcation flags to be inserted automatically to keep track of habits of a user.

27. The method of claim 16, further comprising employing demarcation flags for securing user access to said digital content data.

28. The method of claim 16, further comprising allowing a user to demarcate said digital content data with one or more demarcation flags.

29. The method of claim 16, further comprising allowing said requesting device to automatically demarcate said digital content data with one or more demarcation flags.

30. The method of claim 16, further comprising employing demarcation flags for super distribution of said digital content data to one or more users.

31. A computer program product including one or more computer readable instructions embedded on a computer readable medium and configured to cause one or more processors to perform the steps recited in claim 16.

32. A computer system including one or more computer hardware and/or software devices configured to perform the steps recited in claim 16.

* * * * *